United States Patent Office  3,546,078
Patented Dec. 8, 1970

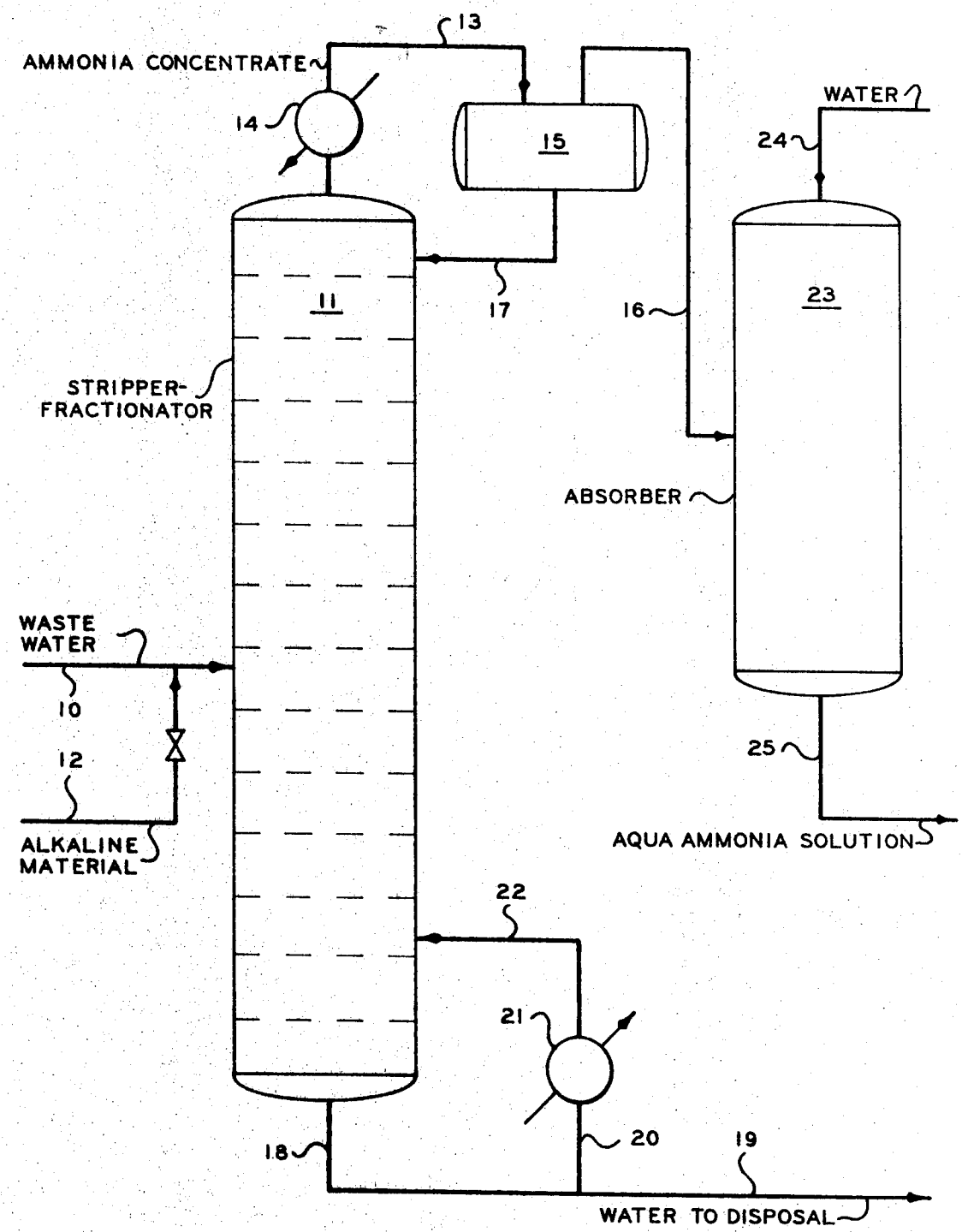

3,546,078
METHOD FOR SEPARATING AND RECOVERING AMMONIA FROM WASTE WATER CONTAINING PHENOL
Leroy C. Kahre and Donald M. Haskell, Bartlesville, Okla., assignors to Phillips Petroleum Company, a corporation of Delaware
Filed Nov. 30, 1967, Ser. No. 686,846
Int. Cl. B01d 3/26
U.S. Cl. 203—42                                   4 Claims

ABSTRACT OF THE DISCLOSURE

Waste water containing small amounts of ammonia and other impurities such as phenol and other materials is passed to a fractionation-stripping zone operated under conditions such that an overhead product containing substantially only ammonia and a bottoms product comprising water and the other impurities followed by dilution of the overhead product with water to produce salable aqua ammonia.

BACKGROUND OF THE INVENTION

The invention relates to the recovery of ammonia from mixtures of water and ammonia which also contain other impurities. In accordance with another aspect, this invention relates to a method for recovering ammonia from waste water containing ammonia and phenolic compounds, and producing a salable aqua ammonia product comprising subjecting the waste water to fractionation and stripping under conditions such that a high ammonia content stream is recovered, which, in turn, is diluted with water to form the salable product. In accordance with a further aspect, this invention relates to a method for recovering a stream comprising substantially only ammonia from a waste water stream containing ammonia, phenol, and other impurities, wherein the amount of phenolics in the overhead is maintained at less than about 15 p.p.m.

In industry, waste water streams sometimes contain objectionable amounts of ammonia and the ammonia is very difficult to remove from the water to desired or necessary low values. For example, in the processing of crude oil the waste water from such operation often contains about 5,000 parts of ammonia per million parts water and this waste water cannot be disposed of until the ammonia content has been reduced to some designated lower value. In some areas a maximum of 10 parts of ammonia per million parts water has been established for waste water, and, therefore, the ammonia content of waste water must be reduced to this level before the water can be dumped into flowing streams. Various methods for removing ammonia from waste water in order to meet the specifications above have been proposed. However, such methods have been undesirably expensive or have not satisfactorily removed the ammonia. In some instances, the waste water streams contain additional contaminants such as phenol, which further complicte the systems from which a salable ammonia product can be recovered.

In accordance with this invention, it has been discovered that waste water containing small amounts of ammonia and other impurities, including phenolic materials, can be treated in a stripping-fractionation zone operated under conditions whereby a bottoms stream with an acceptably low ammonia content and an overhead stream comprising substantially only ammonia is recovered. This overhead stream then can be diluted with water and used as a salable product to offset the cost of treating the waste water to permit discharge of said water into rivers.

Accordingly, an object of this invention is to provide a method for removing ammonia from a mixture of ammonia and water containing other impurities or contaminants.

It is also an object of this invention to provide a method for reducing the ammonia content of a mixture of ammonia and water where the ammonia is present in the water in a low concentration.

A further object of this invention is to provide a method for modifying a fractionation-stripping process whereby a stream comprised principally of ammonia is removed overhead and water and other impurities as a bottoms product.

Other aspects, objects and the several advantages of this invention will be apparent to one skilled in the art upon a study of this disclosure and the appended claims.

SUMMARY OF THE INVENTION

In accordance with this invention, waste water containing a small amount of ammonia and other impurities, including phenolic compounds, is subjected to a fractionation-stripping operation operated so that substantially all of the ammonia is taken overhead in high concentration and the other impurities including phenolic compounds are taken out along with the bottoms water product.

The concentrated ammonia taken overhead from the fractionation-stripping operation can then be diluted with water as in an absorber to make the salable aqua ammonia product.

It has been found that a waste water stream containing up to about 5000 parts of ammonia per million parts water and containing phenolic compounds can be separated in a fractionation-stripper, operated with a minimum boil-up to feed ratio of at least 20 percent, into an overhead product containing substantially only ammonia and into a bottoms product containing nearly all of the water and phenolic compounds and with so little ammonia that it can be discharged into rivers.

Normal practice in distilling aqueous ammonia streams to recover aqua ammonia is to distill such streams to remove an overhead stream containing about 25 percent ammonia. However, when the ammonia stream also contains phenol, a substantial amount of phenol goes overhead with the ammonia and water. The phenol is objectionable for normal usage of the aqua ammonia. It may seen surprising that phenol with a boiling point of 182° C. goes overhead with water and ammonia in a fractionator when both water and ammonia have much lower boiling points. However, phenol and water form an azeotrope that boils at 99.5° C. and thus any water going overhead will carry phenol with it in an amount corresponding to the azeotrope composition. In accordance with this invention, it has been found that by operating the fractionator under conditions to recover an overhead stream containing at least 90 percent ammonia (high ammonia concentration in upper part of fractionator) that the water-phenol azeotrope is broken in the upper part of the fractionator and thus little or no phenol is taken overhead with ammonia. The concentrated ammonia can then be diluted back to the normal 25 percent aqua ammonia concentration without phenol contamination. Simultaneously, there is produced from the fractionator a bottoms water stream containing most of the water in the feedstream but containing so little ammonia that it can be discharged into a flowing river.

In accordance with one embodiment of the invention, it has been further found that the separation of ammonia from water is facilitated by adding a small amount of a basic metal compound such as sodium hydroxide or calcium hydroxide to the feed water passed to the fractionation-stripping zone.

In a further embodiment of the invention, it has been found that a fractionation-stripping zone having an upper condensing section, a fractionation section, and a lower stripping section with feed introduced between the fractionation section and stripping section results in a system particularly adapted to the recovery of ammonia from waste water streams containing ammonia as well as other impurities including phenol.

DESCRIPTION OF PREFERRED EMBODIMENTS

The invention is particularly adaptable to the recovery of ammonia from waste water streams present in refineries and other processing plants containing small amounts of ammonia as well as other impurities. The invention is especially adaptable for the recovery of ammonia from such streams which also contain phenol which present a specific separation problem, as noted above. Waste water streams treated according to the invention can contain as much as 1,000 to 10,000 parts ammonia per million parts of water. The amounts of phenol present will vary, but can be as high as 1,000 parts per million parts of water. Other impurities often present in waste water streams include carbonate, sulfides, cyandies, thiocyanates, etc.

As noted above, the addition of an alkaline material facilitates the separation of ammonia from water. For example, about 50 to 150 parts per million of sodium hydroxide or calcium hydroxide added to the feed water facilitates removal of ammonia from an aqueous stream, presumably by reducing the tendency of the ammonia to ionize. Any basic compound can be used to adjust the pH of the feed water. However, the alkali and alkaline earth metal oxides, hydroxides, and carbonates will usually be preferred because of cost, availability and acceptability of the resulting waste stream. Alkali and alkaline earth metal salts are generally not objectionable in waste streams.

The fractionator employed will ordinarily be operated with an upper temperature of about 110° F. and a pressure of about 15 p.s.i.g. although higher pressures can be uned in which case the temperature will be correspondingly higher. An internal condenser can be used in the top of the fractionator, particularly in the case of small fractionators, but an external condenser with conventional reflux facilities will generally be used on large fractionators.

The fractionator-stripper contains bubble-caps trays, perforated trays, packing or other conventionally employed vapor-liquid contacting material. Heat is added to the bottom of the stripper in amount sufficient to boil-up vapor in an amount equivalent to at least 20 percent of the feed. This is necessary in order to obtain a bottoms water stream with an acceptably low ammonia content.

As indicated previously, it is preferred to take overhead from the fractionation-stripping zone in an overhead stream comprised principally of ammonia. It is most preferred to operate the column under conditions such that a stream containing at least 90 percent ammonia is taken overhead. This is accomplished by operating the fractionator with sufficient reflux to obtain the required 90 percent ammonia concentration in the overhead product. The exact reflux ratio depends on the feed-stream composition, the height of contacting material, and the product purity desired. Adjustment of these operating variables is conventional practice in the fractionation field.

The ammonia stream taken overhead from the fractionation-stripping zone is passed to a separate zone, for example, an absorption zone, wherein fresh water is added and mixed with the ammonia stream in proportions such that an aqua ammonia stream containing about 25 percent aqua ammonia is recovered. This product can then be sold or used otherwise, as desired.

Referring to the drawing, a waste water stream containing ammonia and phenolic materials is introduced into stripper-fractionator 11 by way of line 10. An alkaline material can be introduced into waste water line 10 by way of valve line 12 to adjust the pH of the feed waste water. Within stripper-fractionator 11 the feed waste water is subjected to a minimum boil-up vapor to feed ratio of at least 20 percent so as to take overhead a stream comprising substantially only ammonia by way of line 13. The overhead removed from stripper-fractionator 11 is cooled by cooler 14. The overhead stream is passed to accumulator 15 from which condensate is returned by way of line 17 to an upper portion of stripper-fractionator 11 as reflux.

Ammonia vapors are removed from accumulator 15 by way of line 16 and passed to absorber 23 wherein vapors are contacted by water introduced by way of line 24. Ammonia is diluted with water and an aqua-ammonia solution containing about 25 percent aqua-ammonia is recovered from absorber 23 by way of line 25.

A bottoms stream comprised principally of water, a small amount of ammonia, and phenolic materials is removed from the lower portion of stripper-fractionator 11 by way of line 18. A portion of this stream is returned to stripper-fractionator 11 through line 20, heater 21 and introduced by way of line 22 as a source of reboiler heat. The remainder of the bottoms product is passed by way of line 19 to disposal.

EXAMPLE I

An aqueous solution containing 5,000 parts ammonia and 500 parts phenol per million parts water was made up to approximate a waste water stream from a refinery operation. The solution was continuously fed to a midpoint of a 30-tray Oldershaw laboratory fractionator operating at atmospheric pressure. Reflux was supplied to the upper portion of the fractionator by means of an internal condenser through which cooling water was passed. By varying the temperature and/or flow rate of cooling water, the amount of overhead vapors condensed and returned as liquid reflux to the upper part of the fractionator was varied. By thus changing the reflux rate, the composition of the overhead vapors was changed as illustrated in Table I.

TABLE I.—CONTINUOUS DISTILLATION OF SYNETHTIC WASTE WATER [1]

| Overhead composition | | Bottoms composition | |
|---|---|---|---|
| Wt. percent ammonia | P.p.m. phenol | P.p.m. ammonia | P.p.m. phenol |
| 58.7 | 4,000 | | |
| 10.4 | 4,400 | 0.2 | 266 |
| 12.9 | 5,000 | 0.5 | 220 |
| 16.3 | 2,450 | | |
| 54.0 | 5,700 | | |
| 85.3 | 240 | 0.5 | 469 |
| 94.9 | 140 | | |
| 98.9 | 39 | | |
| 96.8 | 12 | | |
| 94.3 | 16 | | |

[1] Contained approximately 0.5 weight percent ammonia and 500 p.p.m. phenol.

Study of the overhead composition data presented in Table I shows the sharp decrease in the phenol content as the ammonia concentration was increased above about 85 percent. Because of its high boiling point relative to that of water, the rather large amounts of phenol in the overhead at the low ammonia concentrations are indeed surprising and can be explained only by existence of a water-phenol azeotrope. It is seen that the azeotrope must have been broken at the high ammonia concentrations by comparing the reduction in water and phenol contents of the overhead as the ammonia content is increased: the water content was reduced from approximately 45 percent to 5 percent, a 9-fold reduction, whereas the phenol content was reduced from about 5,000 p.p.m. to about 50 p.p.m., a 100-fold reduction, as the ammonia concentration was increased from about 55 percent to 95 percent. Had the azeotrope not been broken, the phenol would have been reduced in the same ratio as the water. Once the azeotrope is broken, however, the phenol is easily removed from the bottom of the fractionator, as shown in Table I, because of its high boiling point.

Encouraged by the results obtained with the "synthetic" waste water of Example I, a sample of real waste water from a refinery with an ammonia content in excess of that allowable for discharge into rivers was obtained and fractionated in the same laboratory column used in Example I. Composition of the refinery stream is given in Table II and results of fractionation tests are given in Table III.

TABLE II.—COMPOSITION OF REFINERY WASTE WATER

| Component | P.p.m. by weight |
| --- | --- |
| Ammonia | 4,640 |
| Sulfide (S=) | 380 |
| Carbonate ($CO_2$) | 15 |
| Phenol (and cresol) | 680 |
| Cyanides | 1 10 |

1 Estimate.

TABLE III.—DISTILLATION OF REFINERY WASTE WATER

| Run No. | 1 | 2 | 3 |
| --- | --- | --- | --- |
| Caustic added, wt. percent | 0 | 0.12 | 0.062 |
| Feed rate, cc./min | 5.6 | 6.1 | 9.3 |
| Boil-up rate, cc./min | 1.8 | 1.8 | 1.8 |
| Boil-up/feed ratio, percent | 32 | 30 | 20 |

Overhead Analysis

|  | Ammonia, wt. percent | Phenol, p.p.m. | Ammonia, wt. percent | Phenol, p.p.m. | Ammonia, wt. percent | Phenol, p.p.m. |
| --- | --- | --- | --- | --- | --- | --- |
| Sample No. 1 |  |  | 96.4 | 0.0 | 95.7 | 30 |
| Sample No. 2 | 95.3 | 6.5 | 92.4 | 4.5 | 92.7 | 13 |
| Sample No. 3 | 93.9 | 0.12 | 95.9 | 4.2 | 96.3 |  |

Bottoms Analysis

|  | pH | Ammonia, p.p.m. | Phenol, p.p.m. | pH | Ammonia, p.p.m. | Phenol, p.p.m. | pH | Ammonia, p.p.m. | Phenol, p.p.m. |
| --- | --- | --- | --- | --- | --- | --- | --- | --- | --- |
| Sample No. 1 | 6.7 | 370 |  | 9.6 | 32 | 336 | 7.9 | 134 | 347 |
| Sample No. 2 | 6.9 | 300 |  | 10.1 | 23 | 198 | 7.6 | 120 | 328 |
| Sample No. 3 |  |  |  |  |  |  | 7.5 | 132 | 304 |

Referring to Table III, it will be observed that the first run of the waste water was made without pretreating the feed with caustic and at a boil-up to feed ratio of 32 percent the phenol content of the overhead ammonia was at an acceptably low level. The amount of phenol going overhead should be below about 15 parts per million. In the second run, caustic was added to the feed in an amount about equivalent to the 300 parts per million ammonia left in the kettle bottoms on run 1. At about the same boil-up to feed ratio, essentially all ammonia was stripped from the water and a nearly phenol-free ammonia was recovered overhead. For the third run, the caustic addition was cut in half and the boil-up to feed ratio was cut to 20 percent. The ammonia in the kettle bottoms was less than the specification of 200 parts per million although this bottoms might have to be diluted with another ammonia-free water stream before discharge into some streams as specifications vary. The phenol in the overhead was at an acceptable level provided phenol-free water can be used to dilute the ammonia to 25 weight percent.

It was thus demonstrated that the invention performed as satisfactorily on a real refinery waste stream containing traces of unknown impurities as on a synthetic stream containing only water, ammonia, and phenol.

EXAMPLE III

Additional tests were made in a 16-foot-tall, 3-inch-diameter fractionator with an internal condenser at the top, 9 inches of ⅜-inch single-turn helices as packing in the fractionation section above the feed inlet, 15 feet of the same packing in the stripping section below the feed inlet, and an electrically heated reboiler at the bottom. The fractionator was operated at a pressure of 15 p.s.i.g., feed inlet temperature of 240° F., reboiler temperature of 250° F., feed rate of 2.17 gallons per hour, variable boil-up rate, and variable reflux condenser temperature.

Three refinery waste water streams with the compositions given in Table IV were fractionated.

TABLE IV.—COMPOSITION OF REFINERY WASTE WATER

| Feed analysis | A | B | C |
| --- | --- | --- | --- |
| Ammonia, p.p.m. | 6,500 | 5,500 | 6,000 |
| Phenol-cresol, p.p.m. | 335 | 350 | 360 |
| Carbonates ($CO_2$), p.p.m. | 40 | 50 | 50 |
| Sulfides (S=), p.p.m. | 610 | 510 | 580 |

Since an internal condenser was used, it was impossible to measure the reflux ratio but the amount of reflux and hence the ratio was increased by decreasing the temperature of the cooling water. By this means the reflux was increased until an overhead ammonia product contained less than 10 p.p.m. phenol with a cooling water temperature of 106° F. With a cooling water temperature of 120° F. (less reflux), the overhead ammonia stream contained 15 p.p.m. phenol. It was thus demonstrated that an overhead ammonia product with acceptably low phenol content was obtainable by proper adjustment of reflux ratio.

The ammonia content of the water bottoms from the fractionator was reduced by increasing the boil-up rate. For example, the water bottoms contained 400 p.p.m. ammonia with a boil-up to feed ratio of 17 percent and an ammonia content of about 200 p.p.m. with a boil-up to feed ratio of 20 percent, i.e., 20 parts of boil-up vapor per 100 parts of feed by weight.

We claim:
1. A method for the separation of ammonia from waste water also containing phenolic materials including phenol and other impurities, which phenolic materials normally form azeotorpes with water when subjected to fractionation, which comprises:
   (a) introducing a waste water stream containing ammonia, phenolic materials and other impurities, as feed, into a stripping-fractionation zone of a column operated at a temperature of about 110° F. and a pressure of about 15 p.s.i.g. wherein said feed is subjected to fractionation conditions and a water-phenol azeotrope is formed within said stripping-fractionation zone, said stripping-fractionation zone being operated under conditions of temperature and pressure sufficient to produce a minimum vapor boil-up and stripping vapor rate equal to at least 20 percent by weight of the rate of said feed introduced into said stripping-fractionation zone,
   (b) removing overhead from said stripping-fractionation zone a vaporous stream containing at least about

90 percent by weight ammonia, said overhead vaporous stream being substantially free of phenolic materials, cooling said overhead vaporous stream to condense at least a portion of the ammonia present in said oevrhead vaporous stream, and passing the cooled overhead containing condensate to an accumulation zone, (c) withdrawing condensate from said accumulation zone and introducing same as reflux into an upper portion of said stripping-fractionation zone in an amount sufficient to obtain at least about 90 weight percent ammonia in said overhead and to maintain a concentration of at least about 90 weight percent ammonia in the upper portion of said stripping-fractionation zone which ammonia concentration is sufficient to break said water-phenol azeotrope present in said stripping-fractionation zone, and (d) withdrawing from said stripping-fractionation zone a bottoms water stream containing phenolic materials and other impurities, said bottoms water stream being substantially free of ammonia.

2. A method according to claim 1 wherein non-condensed ammonia present in said overhead stream is removed from said accumulation zone and passed to an abosrption zone wherein it is diluted with water to form a salable aqua ammonia stream.

3. A method according to claim 1 wherein said stripping-fractionation zone is comprised of an upper condensing section, an intermediate fractionation section, and a lower stripping section, said feed is introduced into said stripping-fractionation zone between the stripping and fractionation sections, and a portion of said bottoms water stream removed from said stripping-fractionation zone is reboiled and returned to said stripping-fractionation zone as a source of heat.

4. A method according to claim 1 wherein said feed contains up to 10,000 parts ammonia per million parts of water and up to 1,000 parts phenolic materials per million parts of water, the amount of phenolic materials in said overhead is less than about 15 parts per million, the amount of ammonia in said bottoms is less than about 250 parts per million, and non-condensed ammonia is removed from said acumulation zone and is contacted with water to form a salable aqua ammonia stream containing about 25 percent aqua ammonia.

References Cited

UNITED STATES PATENTS

| | | | |
|---|---|---|---|
| 929,726 | 8/1909 | Stine | 203—49 |
| 1,324,979 | 12/1919 | Piron | 23—193 |
| 1,595,602 | 8/1926 | Heffner et al. | 23—193X |
| 1,954,973 | 4/1934 | Zaniboni | 23—193 |
| 1,962,150 | 6/1934 | Mohler et al. | 23—193X |
| 2,088,817 | 8/1937 | Shoeld | 203—42X |
| 2,301,709 | 11/1942 | Rumscheidt et al. | 202—37 |
| 2,905,597 | 9/1959 | Stafford et al. | 203—40X |
| 3,305,582 | 2/1967 | Cook et al. | 203—42 |
| 1,566,796 | 12/1925 | Heffner et al. | 260—627 |
| 1,957,295 | 5/1934 | Shaw | 260—627 |
| 1,989,177 | 1/1935 | Tiddy | 260—627 |

FOREIGN PATENTS

| | | | |
|---|---|---|---|
| 288,436 | 4/1928 | Great Britain | 23—193 |

NORMAN YUDKOFF, Primary Examiner

F. E. DRUMMOND, Assistant Examiner

U.S. Cl. X.R.

203—65; 260—627